United States Patent [19]
Barton

[11] Patent Number: 5,529,322
[45] Date of Patent: Jun. 25, 1996

[54] COMBINATION TRANSPORT DEVICE AND PORTABLE WORK SURFACE

[76] Inventor: Deborah E. Barton, 300 Farington #20, Holland, Mich. 49423

[21] Appl. No.: 326,946

[22] Filed: Oct. 21, 1994

[51] Int. Cl.⁶ .................................................. B62B 1/12
[52] U.S. Cl. ........................ 280/30; 108/144; 211/187; 248/129; 248/170; 280/645; 280/655; 280/47.18; 280/47.29
[58] Field of Search .................................. 108/128, 144; 211/187; 248/129, 166, 170; 280/30, 645, 646, 651, 652, 655, 47.18, 47.19, 47.27, 47.29

[56] References Cited

U.S. PATENT DOCUMENTS

| | | | |
|---|---|---|---|
| 1,839,607 | 1/1932 | Slauson | 248/170 X |
| 2,784,004 | 3/1957 | Hamrick, Jr. | 280/30 |
| 3,041,032 | 6/1962 | Wilcox | 248/170 |
| 4,684,091 | 8/1987 | Moreschi | 248/166 |
| 5,190,304 | 3/1993 | Prentiss et al. | 280/47.29 |

*Primary Examiner*—Anne Marie Boehler
*Assistant Examiner*—Michael Mar
*Attorney, Agent, or Firm*—Sughrue, Mion, Zinn, Macpeak & Seas

[57] ABSTRACT

A combination transport device and work surface has a collapsible support member and base member. In the collapsed position, the support member and base member are close to a stem of the device to define a transport surface. The transport surface can be easily moved via a handle and wheels. In the extended position, the support member and the base member extend transversely from the stem to define a work surface and a support base respectively.

4 Claims, 9 Drawing Sheets

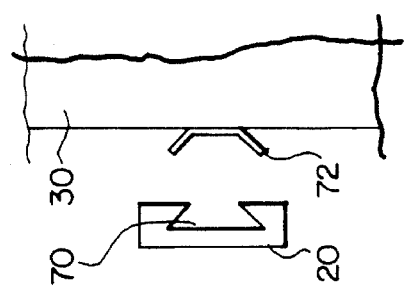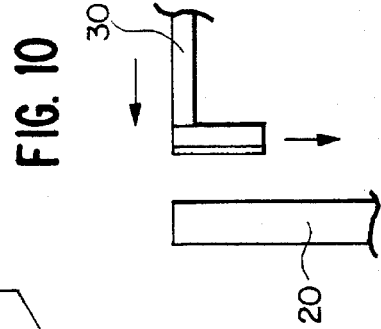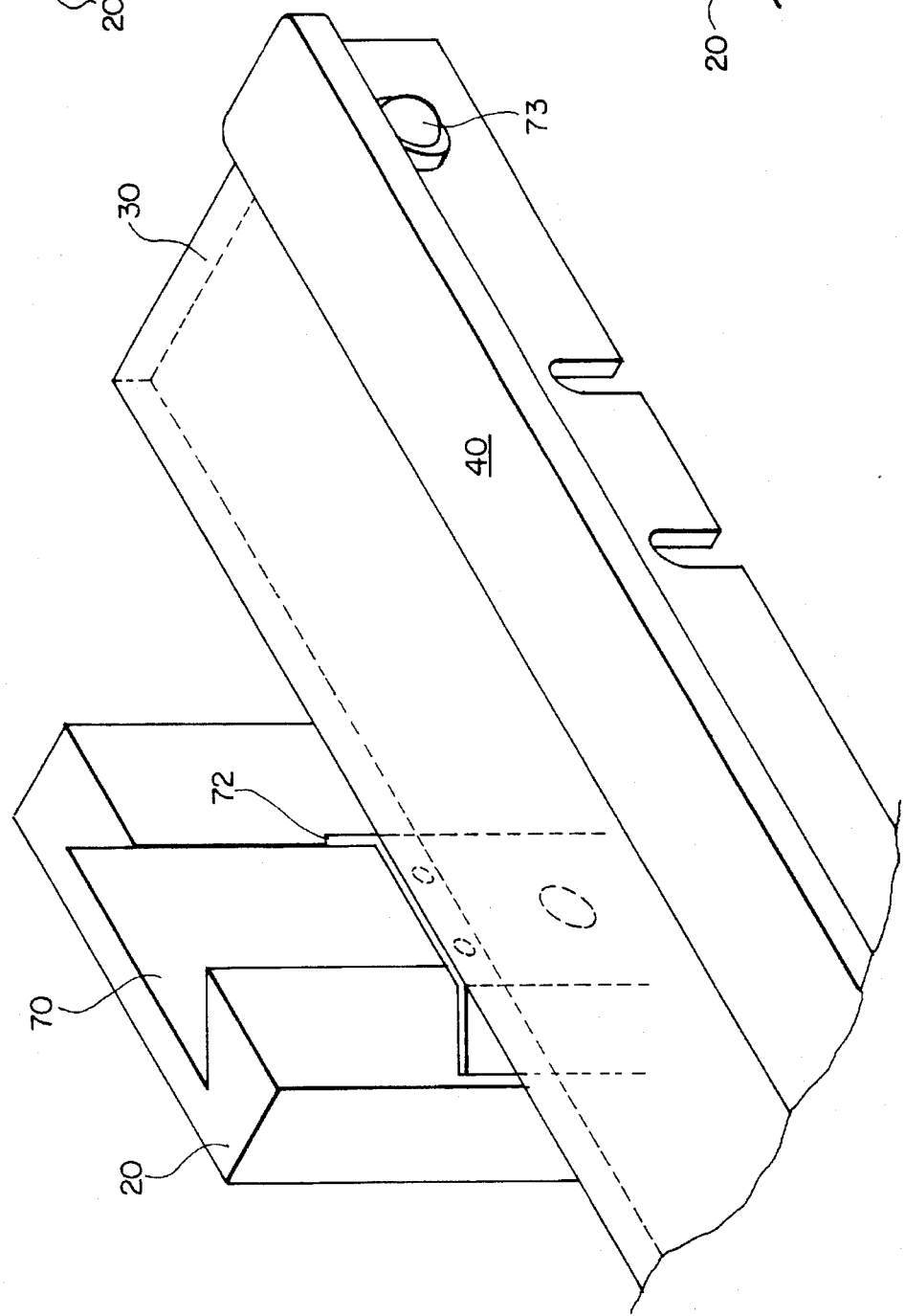

COMBINATION TRANSPORT DEVICE AND PORTABLE WORK SURFACE

BACKGROUND OF THE INVENTION

1. Field of the Invention

The subject invention relates to a transport device having a portable work surface, and particularly to a device capable of carrying a portable computer, or the like, and associated devices and providing a work surface for supporting the devices during use.

2. Description of the Related Art

The use of computers has increased steadily over the last decade. In fact, the ability to access, store, and manipulate data with computers has made computers an indispensable business tool. Further, recent technological advances with respect to miniaturization has allowed substantial computing power to be accommodated in a small portable package. Such devices are known as "laptop" or "notebook" computers The development of such portable computers along with the flexibility of remote systems has resulted in an increase in the number of people traveling with computers and working in "virtual spaces" which can be anywhere that the person and computer happen to be, such as an airport, the office of another, and hotel rooms.

Although computers have become smaller, and lighter, the peripherals required to support mobile computing in virtual spaces is quite large and thus the traveling weight of a complete system can be quite high. For example, a complete system may include a modem, cellular phone, printer, instruction manuals, power converters, and cables. Therefore the load handling requirements of the typical mobile worker can be substantial Additionally, increased use of keyboards and other devices associated with the operation of a computer have recently been discovered to be the source of repetitive strain injuries. Studies have shown that repetitive strain injuries, as well as back strain, eye strain, and other work related injuries can be alleviated by proper posture and support. In fact, recent ADA and OSHA regulations have begun to define standards for computing support. To comply with these regulations, and to reduce medical expenditures, many employers have begun to invest in adjustable keyboard supports, wrist rests, foot rests and other devices to properly position and support workers who operate computers. However, these devices are fixed devices which cannot easily be moved form one location to another along with the worker.

In addition, portable luggage carts are well known. Such devices have wheels and can be collapsed for storage. However, known luggage carts do not have any type of work surface on which a computer, or the like, can be supported during use. Clearly, luggage carts do not address the above-noted support problems associated with mobile computing.

SUMMARY OF THE INVENTION

In view of the above, it is an object of the invention to provide a device which facilitates transport of a portable computer, or other work device, and associated devices.

It is a further object of the invention to provide a transport device which easily converts to a work surface for supporting a portable computer, or the like.

It is still a further object of the invention to provide a device which properly supports a worker who is operating a computer, or the like.

In order to accomplish the objectives above, the invention includes a main stem, a support base, and a keyboard tray. Both the support base and the keyboard tray are adjustable on the main stem to allow the device to achieve various configurations. In a collapsed state, wheels coupled to the base are accessible to allow the device to be easily moved. The position of the keyboard tray is easily adjustable and a wrist support can be coupled thereto. The invention also allows for the configuration of a foot support creating a stable base in the engaged state. Luggage can be coupled to the device by conventional straps or by being locked into the extended "members" of the collapsible foot rest/base.

BRIEF DESCRIPTION OF THE DRAWINGS

The invention will be better understood based on the following description of preferred embodiments thereof taken in connection with the Figures in which:

FIG. 8 is a perspective view showing the stem channel configuration in detail;

FIG. 9 is a top view showing the stem channel configuration in detail;

FIG. 10 is a side view showing the stem channel configuration in detail;

DETAILED DESCRIPTION OF THE PREFERRED EMBODIMENTS

Figure 1:
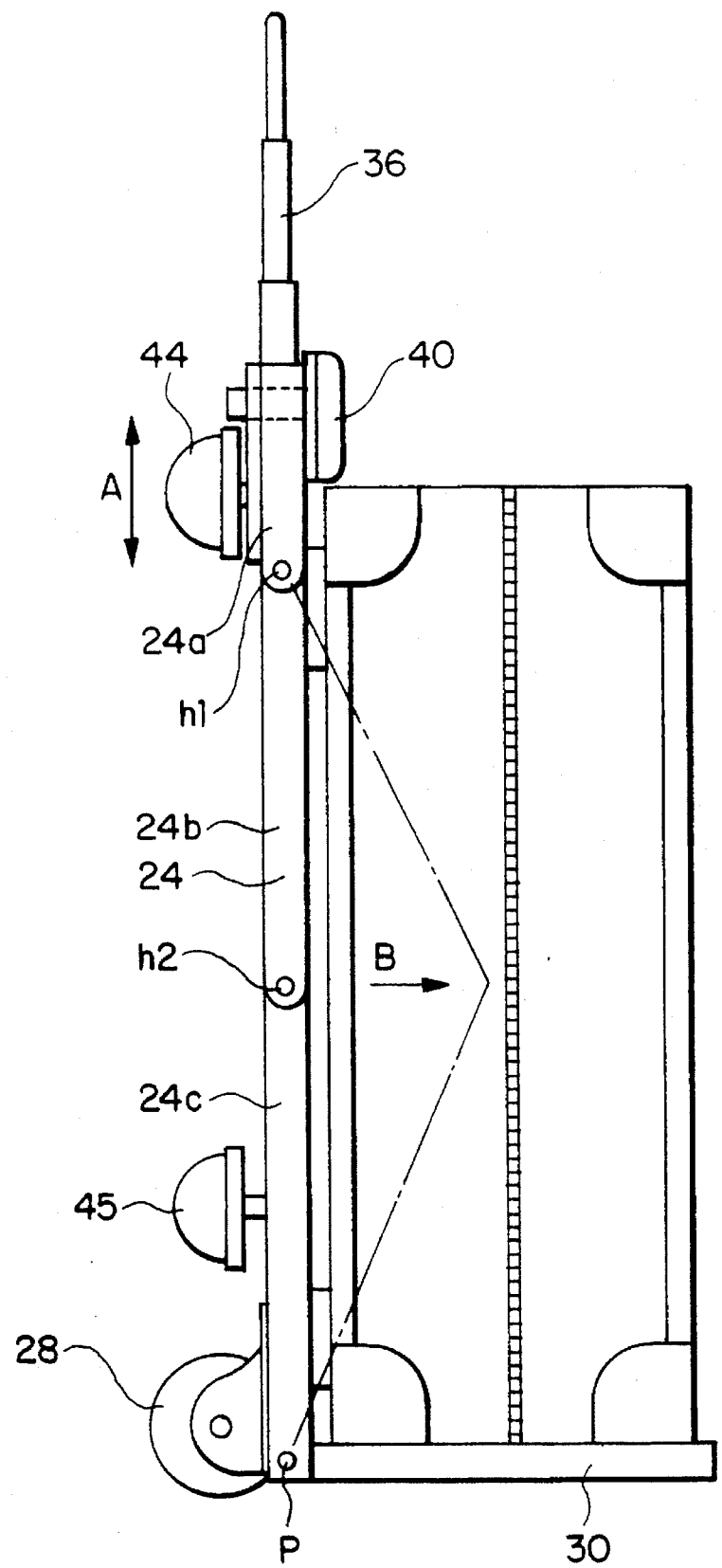
FIG. 1 illustrates a first preferred embodiment in the transport mode with a piece of luggage supported thereon.
Figure 3A:
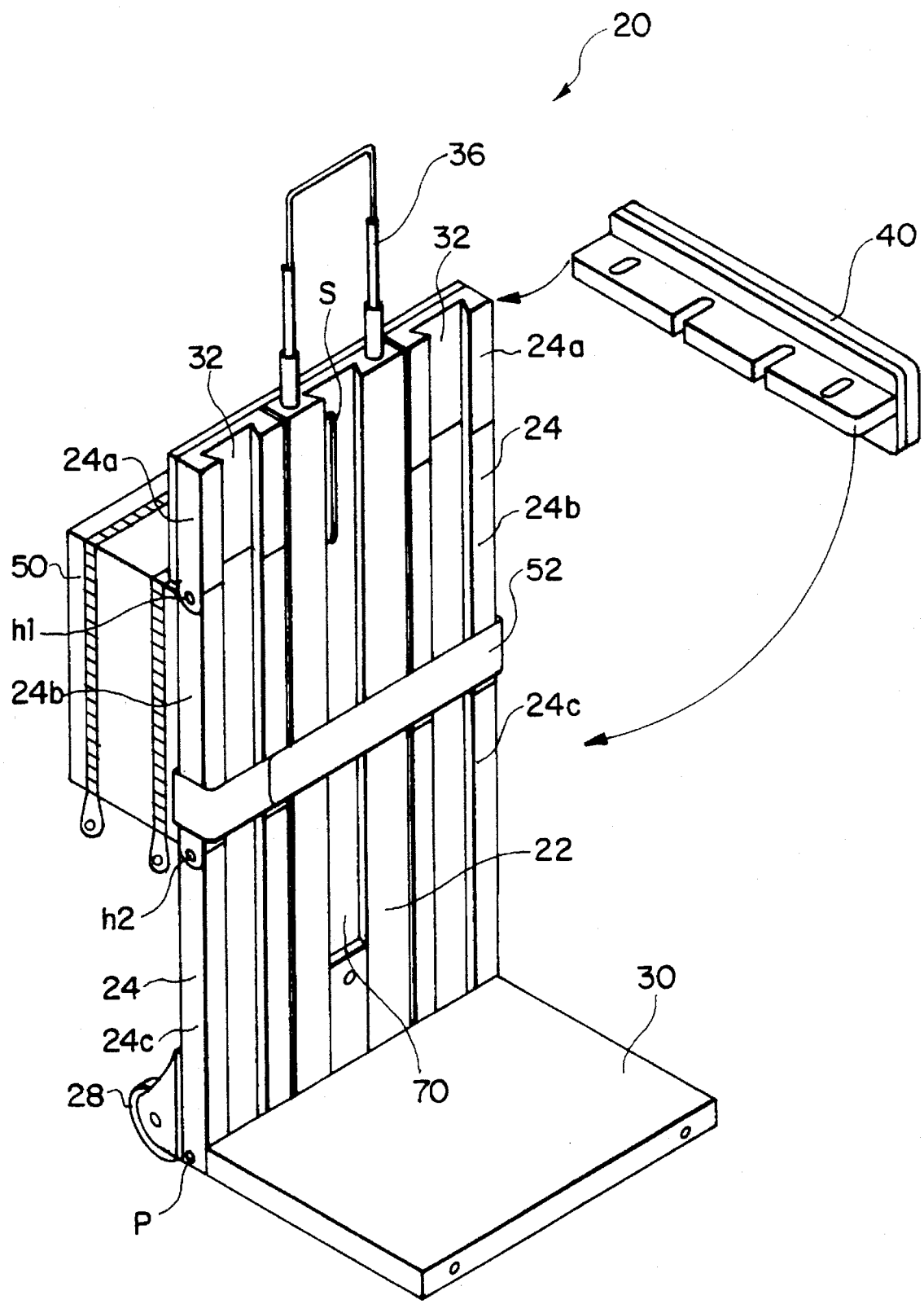
FIG. 3A illustrates the first preferred embodiment in the transport mode without any luggage after the palm rest has been removed.
Figure 3C:
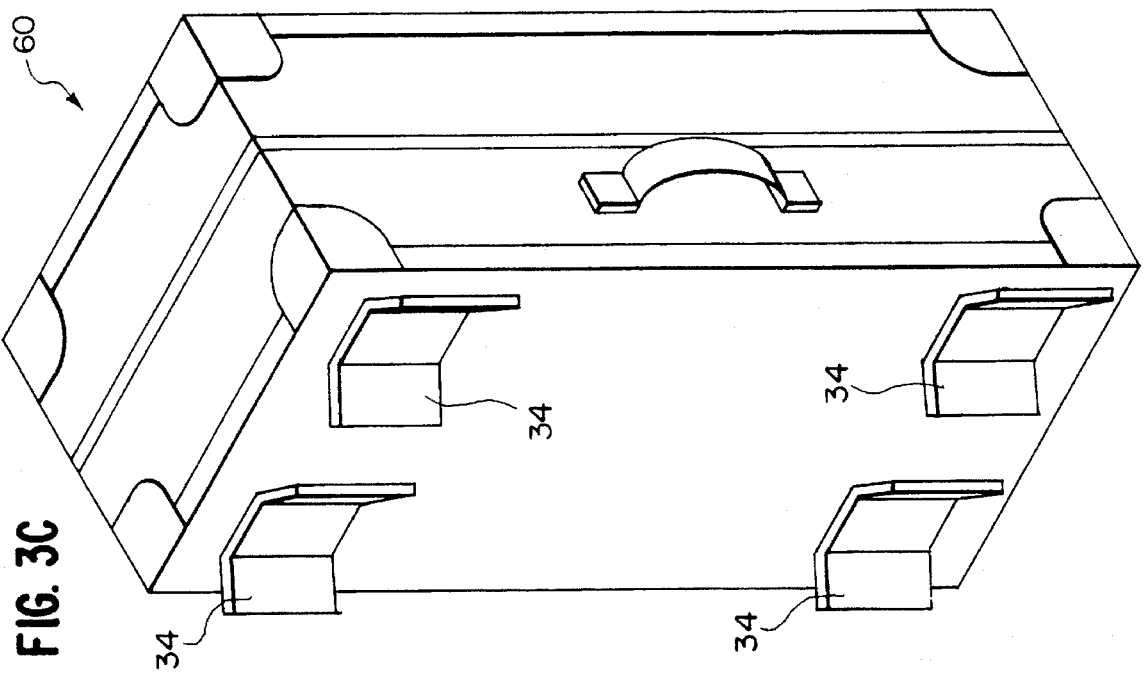
FIG. 3C illustrates the optional luggage of the first preferred embodiment.
Figure 3B:
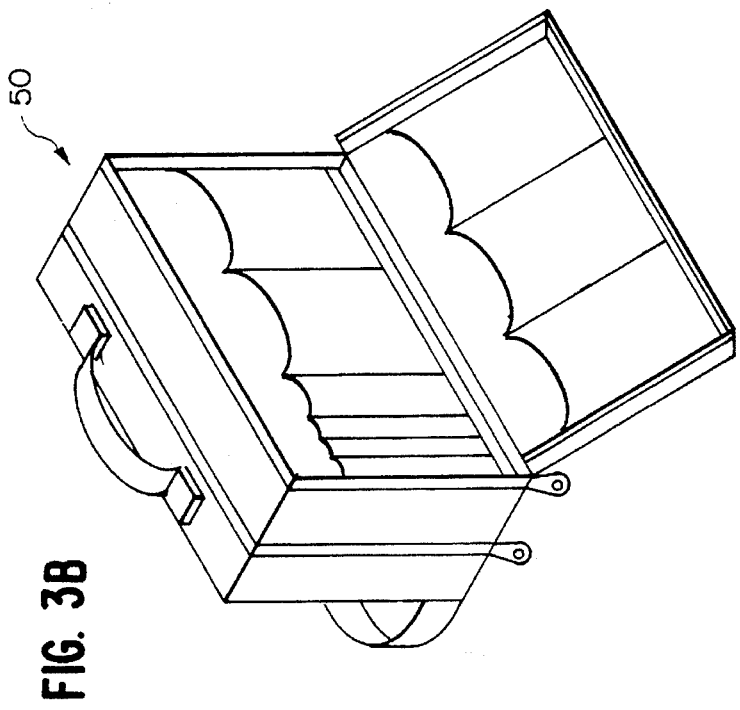
FIG. 3B illustrates the optional utility bag of the first preferred embodiment.

FIGS. 1 and 3A illustrate the first preferred embodiment in a transport mode. Transport 20 is constructed essentially of three main parts. Stem 22 and two moveable members 24. Once moveable member 24 is disposed on each side of stem 22, it defines a substantially flat surface when moveable members 24 are in the extended position as shown in FIG. 3. Movable members 24 are each constructed of upper portion 24a, middle portion 24b and lower portion 24c which are hinge connected together by hinges h1 and h2. Hinges h1 and h2 can be a hinge pin extending through holes formed in the respective portions or any other appropriate hinge device. Upper portions 24a are slidably mounted to stem 22 to be slidable up and down in the direction indicated by arrow A in FIG. 1. For example, upper portions 24a can have a protrusion thereon which is received in a track groove defined in a side of stem 22. Lower portions 24c are pivotally connected to stem 22 at point p by a pin or the like. Tray 30 is secured to stem 22, in a manner which is discussed in greater detail below, to extend transversely from stem 22. An elongated bar serves to connect upper portions 24a to each other. The elongated bar extends behind stem 20.

Figure 5C:
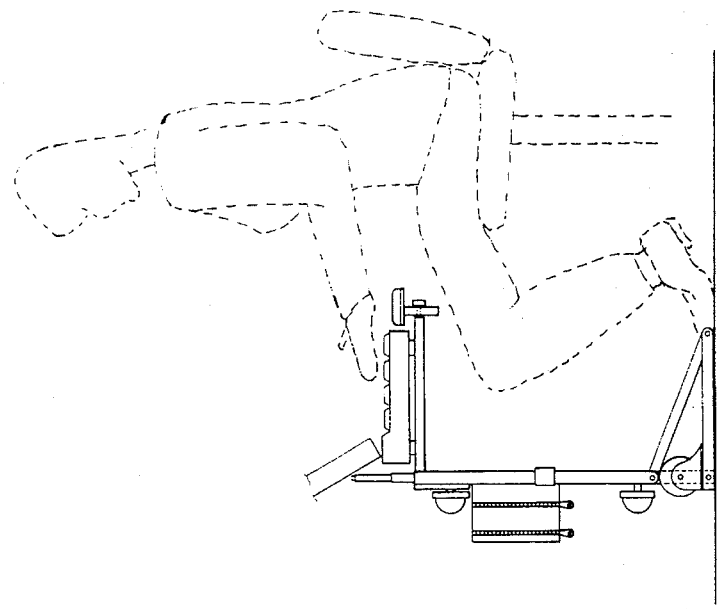
FIGS. 5A–C illustrate typical operator posture while using the preferred embodiments.
Figure 5B:
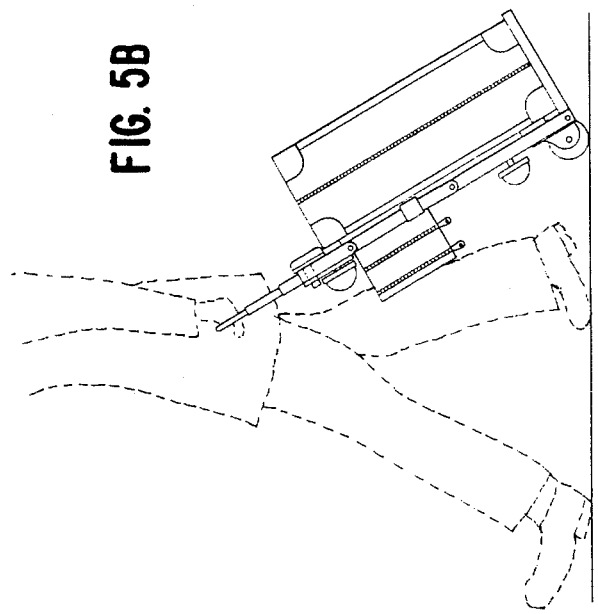
Figure 5A:
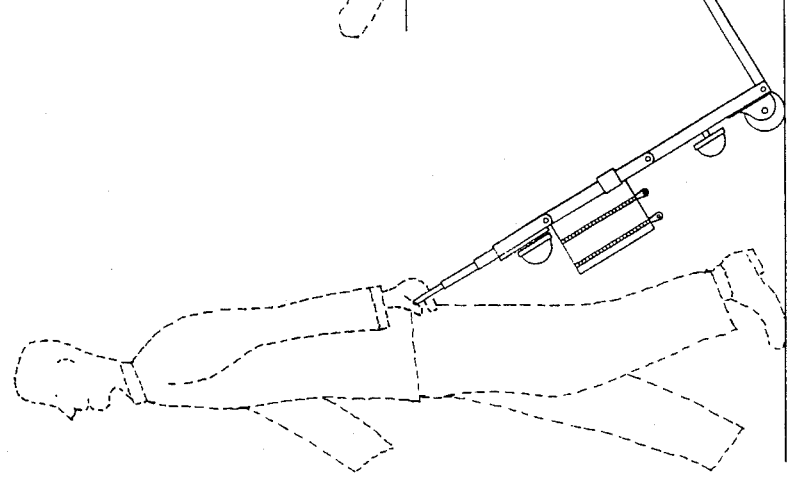

When transport 20 is in the transport mode, luggage 60 and utility bag 50 can be attached thereto by velcro straps 52, bungee cords or any other appropriate means. Transport 20 can then be pulled on wheels 28 in a manner similar to a conventional luggage cart as illustrated in FIGS. 5A and 5B. Telescoping handle 36 is provided to allow transport 20 to be easily pulled. Typically, utility bag 50 is used for carrying the computer and peripherals associated with a portable computer. However, any combination of containers can be mounted on transport 20 and these containers can, of course contain a computer or any other items needed by the user such as clothes and toiletries.

In the preferred embodiment, moveable members 24 each have elongated channel 32 formed therein. Channel nuts 34 are affixed to a back surface of luggage 60 and can be slid into respective channels 32 to fix luggage 60 to transport 20. Specifically, luggage 60 can be lifted above transport 20 so that channel nuts 34 oppose the upper opening of respective channels 32 and luggage 60 can be lowered so that channel nuts 34 slide into channels 32. A front portion of channels 32 is narrowed so that channel nuts 34 can only exit channels 32 through the top opening thereof. Channel nuts 32 can be formed integrally on luggage 60 or conventional luggage can be retrofitted to include channel nuts 34.

Once luggage 60 is lowered onto transport 20, lock bar 40 can be attached to stem 22 by thumbscrew 73 which includes a bolt extending through slot s formed in an upper portion of stem 20 and members 24. Alternatively, lock bar 40 can have thumb screws, or the like coupled thereto which can be threadably engaged with an upper portion of stem 20. Lock apparatus 44 can be tightened from a rear portion of transport 20 while engaged with a threaded nut, or the like, formed on lock bar 40 to fix lock bar 40 to stem 22 and prevent luggage 60 from moving upward out of channels 32 and detaching from transport 20.

When the user has reached a destination at which a work surface is needed, i.e. a virtual workspace is to be created, luggage 60 can be removed in a manner opposite the attachment procedure described above. At this time, transport 20 can be easily converted to a work mode. Specifically, tray 30, which is secured in channel 70 formed along a length of stem 20 is moved upward, and relocated at the top of stem 20. FIGS. 8–10 illustrate the connection between platform 30 and stem 20 in detail. Angular plate 72 is fixed to an edge of platform 30. Angular plate 72 is shaped to conform to a cross section of channel 70 so that when angular plate 72 is received in channel 70, it can slide along channel 70 but is restrained from lateral or torsional movement. Second locking device 45, similar to locking device 44 described above, serves to secure tray 30 to stem 20 while angular plate 72 is received in channel 70. Second locking device 45 can be released to allow tray 30 to slide. At this time, first locking device 44 can be used to lock tray 30 in place at an upper portion of stem 20. In this position, tray 30 serves as a work surface. First locking device and tray 30 can be moved along slots to allow tray 30 to be locked at a desired height which is ergonomically correct for the user.

To provide a base, hinge portions h2 can be moved in the direction of arrow B in FIG. 1. This movement causes upper portion 24a to move downward and lower portion 24c to pivot about pin p (clockwise in FIGS. 1 and 2). Hinge portion h2 is restrained from further movement in the direction opposite to arrow B through engagement with stem 20 or construction of the hinge itself, for example. Also, first lock apparatus 44 can extend laterally (see FIG. 7) to prevent movement of central portion 24b to the left in FIG. 1 and thus prevent the central hinge portion h2 from moving further in a reverse direction. Further, the lock apparatus can be engaged with upper portion 24a to prevent linear movement thereof and thus prevent reverse movement of central hinge portion h2.

Figure 2:
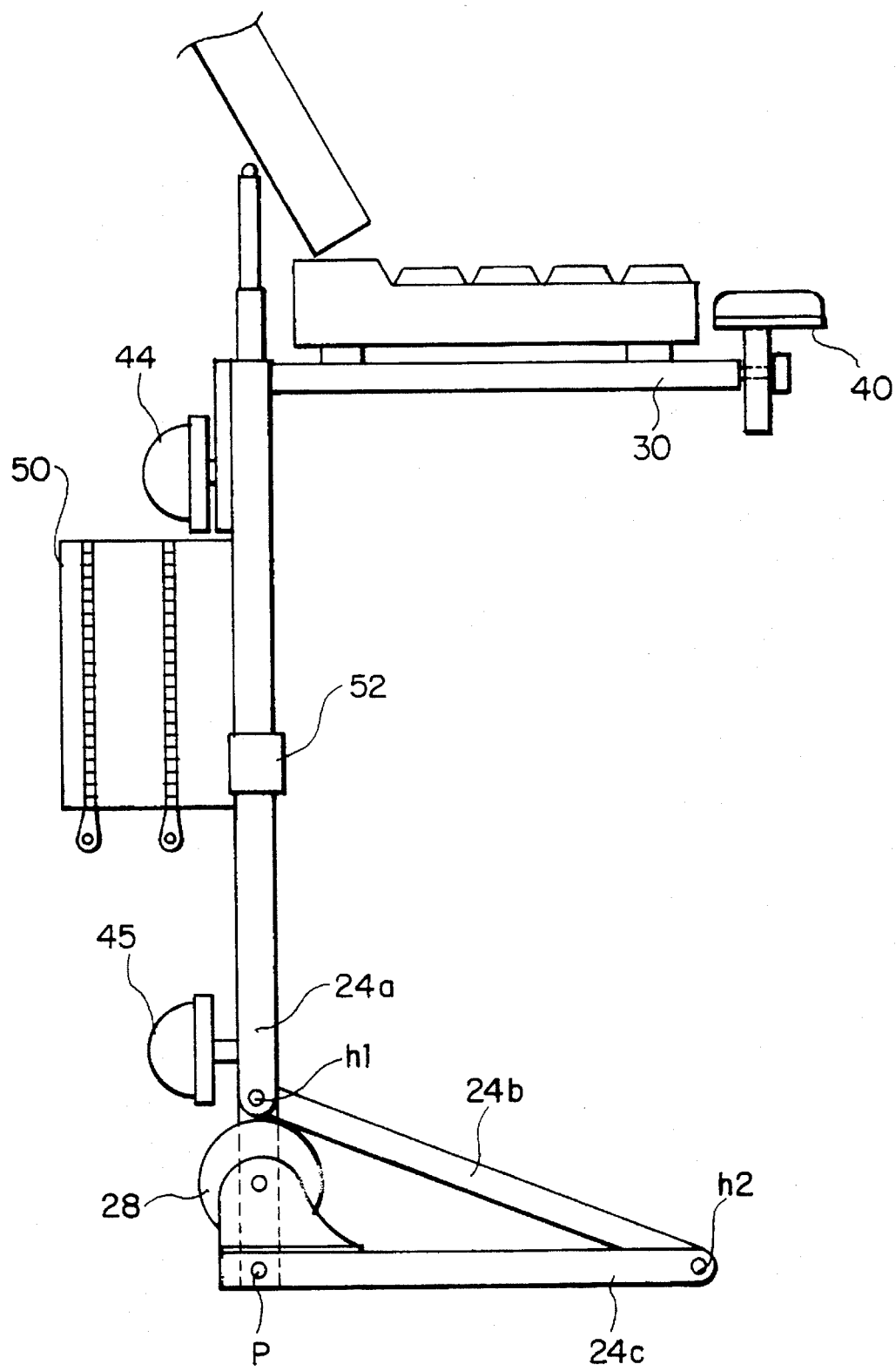
FIG. 2 is a side view of the first preferred embodiment in a work mode supporting a portable computer and a utility bag with side "members" collapsed to form the footrest/base.
Figure 4:
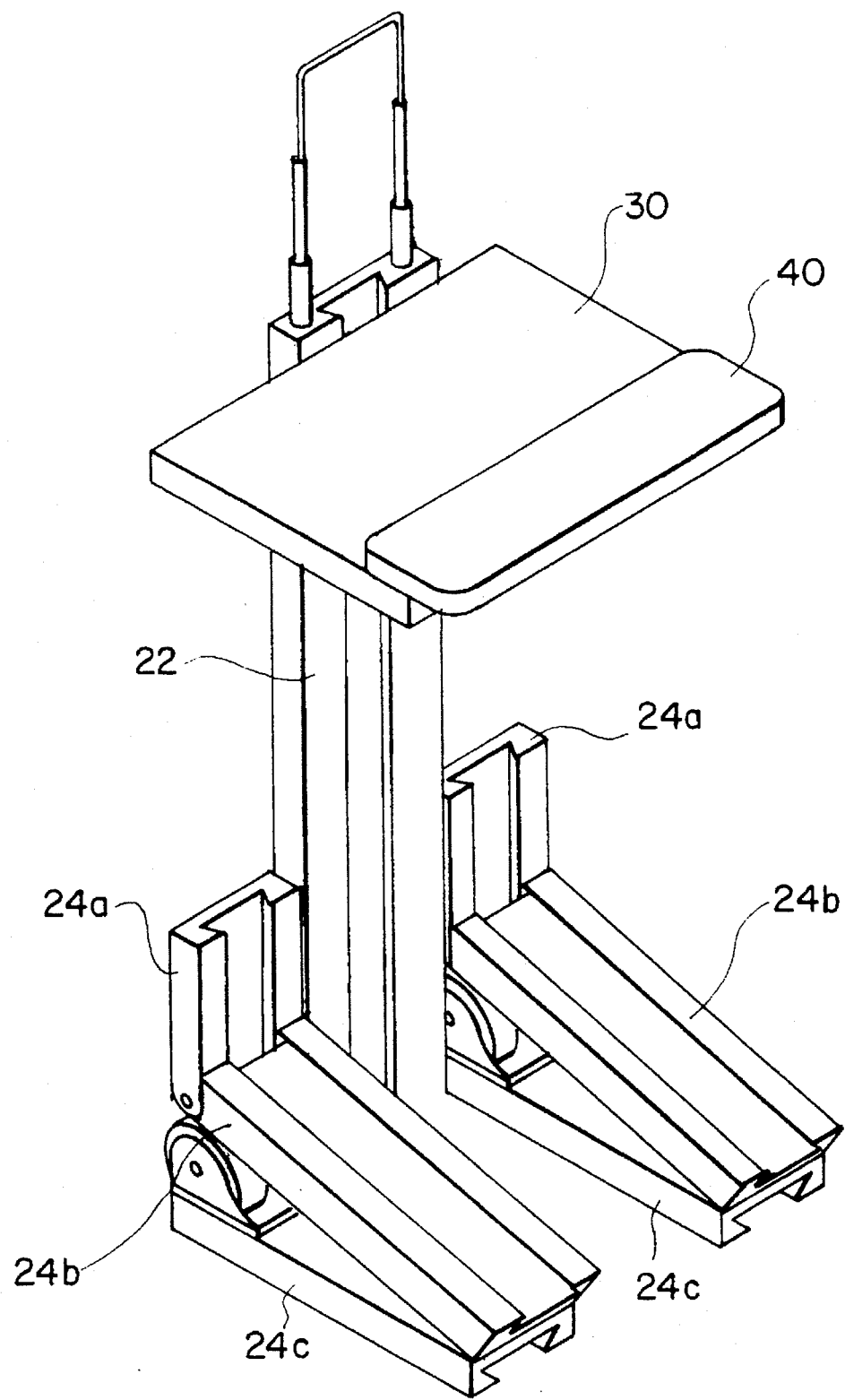
FIG. 4 is a perspective view of the first preferred embodiment in the work mode.

In the working mode illustrated in FIG. 2, central portion 24b serves as an angled footrest and lower portion 24c serves as a stable base to support stem 22 and tray 30. Locking apparatus 45 is threadably engaged with a nut, or the like, formed in the bar which connects upper portions 24a to secure moveable members in the position illustrated in FIG. 2. In this manner, a stable work surface, which can be used to support a portable computer or the like, is defined by tray 30. Also, angled foot rests are defined by central portions 24b. Finally, lock bar 40 can have a soft resilient wrist rest defined thereon and can be easily attached to an edge of tray 30 by thumbscrews coupled thereto, or the like, as illustrated in FIG. 2. This configuration, which is illustrated best in FIG. 4, provides a convenient work surface with proper ergonomic support at any location. Of course, the height of the work surface can be adjusted by loosening locking apparatus 44 and sliding tray 30 up and down along slot s and subsequently once again tightening locking apparatus 44. Also, angle adjustment for the footrests could be provided by known mechanical elements. A typical operator work position is illustrated in FIG. 5B.

Figure 6:
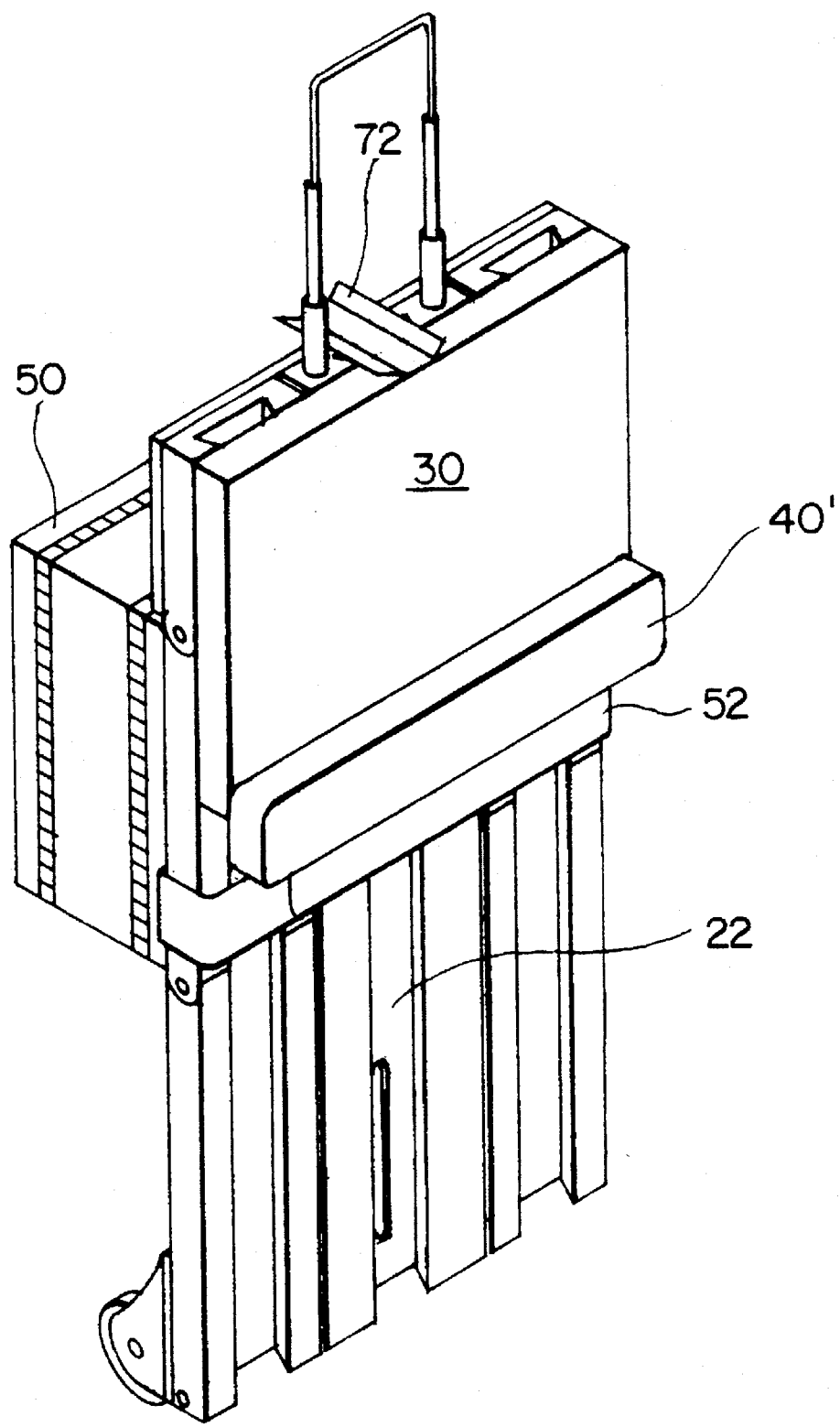
FIG. 6 is a front perspective view of a second preferred embodiment.
Figure 7:
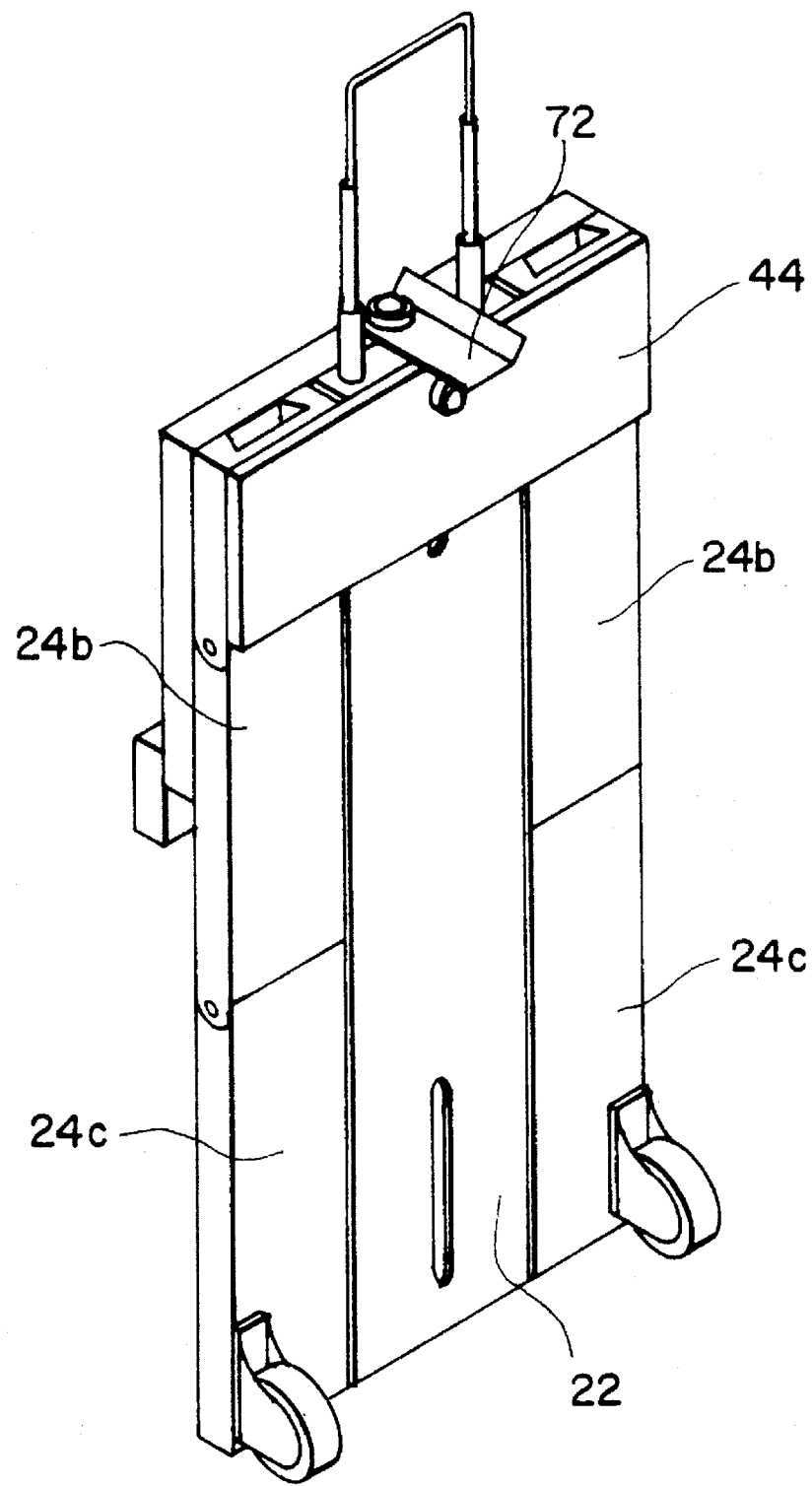
FIG. 7 is a rear perspective view of the second preferred embodiment.

FIGS. 6 and 7 illustrate a second preferred embodiment of the invention which is best adapted to use where transport of large luggage is not required. In this embodiment like elements are labeled with the same reference numerals as in the first embodiment and are not described in detail to avoid redundancy. In this embodiment, tray 30 is connected to an upper portion of stem 22 and, in the transport position illustrated in FIGS. 6 and 7, essentially parallel with stem 22. Locking apparatus 44, which is similar to locking apparatus 44 of the first embodiment, has a bolt which is threadably engaged with a nut or the like formed on a rear surface of tray 30 in order to secure tray 30 in this position. Locking apparatus 44 has a transverse bar which extends to upper portions 24a of the moveable members to also lock the moveable members in the transport position. Utility bag 50 can be secured to the transport 20 in the same manner as in the first embodiment. Further, a portable computer or other light baggage can be secured to the front or rear of the transport by strap 52.

When transport 20 is to be set into the work mode, locking apparatus 44 is first released and tray 30 is fastened to stem 22 in a manner similar to the first embodiment (see FIGS. 8 and 5c) and moveable members 24 are folded downwards in a manner similar to the first embodiment. In this embodiment, locking apparatus 44 is coupled to upper portions 24a by the transverse bar so that as the moveable members are folded downward to the work position, locking apparatus 44 moves downward along slots. When moveable members reach the proper position, locking apparatus 44 can be locked once again to secure the base and footrest of transport 20 in the work mode. Therefore, only one locking apparatus is required. Tray 30 can be secured on the extended position by the use of known locking hinges, an extendable support bar or other known devices.

From the description above, it is clear that the invention allows a portable computer and other equipment to be easily transported to any desired location and further allows a virtual work space to be set up in the desired location. In the workspace, the invention provides proper support for the computer and the operator to minimize fatigue and injuries.

The invention has been described through preferred embodiments. However, it is apparent that various modifications can be made without departing from the scope of the invention as defined by the appended claims. For example, various features of the preferred embodiments can be combined and interchanged as desired. Also, various mechanical devices can be used to secure the various portions of the invention in the desired positions.

What is claimed is:

1. A wheeled transport device comprising:

a stem;

a support member coupled to said stem and being movable between an upper work position, wherein said support member defines a work surface, and a lower transport position wherein said support member defines an article transport surface; and at least one movable member, each movable member comprising an upper portion which is slidably coupled to a side portion of said stem to be movable therealong, a central portion pivotally coupled at an upper end to a lower end of said upper portion, and a lower portion having a lower end pivotally coupled to a lower part of said stem and an upper end pivotally coupled to a lower end of said central portion, each movable member being movable between a collapsed position wherein said movable member is substantially coplanar with said stem, and an extended position wherein said upper portion is proximate said lower part of said stem and said lower portion extends transversely from said stem to define a support base.

2. A transport device as set forth in claim 1, wherein said central portion extends at an angle relative to said lower portion to define a footrest when said at least one movable member is in the extended position.

3. A transport device as set forth in claim 1, further comprising a locking device for selectively locking said at least one movable member in said collapsed and extended positions.

4. A transport device as set forth in claim 1, wherein there are two of said movable members.

* * * * *